United States Patent [19]

Kishita et al.

[11] Patent Number: 5,464,917
[45] Date of Patent: Nov. 7, 1995

[54] ORGANOPOLYSILOXANE

[75] Inventors: Hirofumi Kishita, Annaka; Kouichi Yamaguchi, Takasaki; Nobuyuki Kobayashi, Annaka; Kouichi Ishida, Gunma, all of Japan

[73] Assignee: Shin-Etsu Chemical Co., Ltd., Tokyo, Japan

[21] Appl. No.: 282,490

[22] Filed: Aug. 1, 1994

[30] Foreign Application Priority Data

Jul. 30, 1993 [JP] Japan ................................ 5-206946

[51] Int. Cl.$^6$ ........................................... C08G 77/08
[52] U.S. Cl. ................... 528/14; 528/18; 528/23; 528/37; 528/42; 556/454; 556/485; 556/488
[58] Field of Search ........................... 556/454, 485, 556/488; 528/42, 37, 23, 14, 18

[56] References Cited

U.S. PATENT DOCUMENTS

| | | | |
|---|---|---|---|
| Re. 29,760 | 9/1978 | Brown et al. | 528/42 |
| 2,961,425 | 11/1960 | Pierce et al. | 556/454 |
| 3,575,921 | 4/1971 | Lee | 556/454 |
| 3,607,899 | 9/1971 | Brown et al. | 556/454 |
| 3,660,453 | 5/1972 | Groenhof et al. | 556/454 |
| 4,348,531 | 9/1982 | Evans | 528/42 |
| 5,116,928 | 5/1992 | Inomata et al. | 528/42 |
| 5,374,702 | 12/1994 | Inomata et al. | 528/37 |

*Primary Examiner*—Melvyn I. Marquis
*Attorney, Agent, or Firm*—Cushman Darby & Cushman

[57] ABSTRACT

A straight-chain organopolysiloxane represented by the general formula:

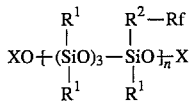

wherein $R^1$ represents a monovalent hydrocarbon group, $R^2$ represents a bivalent organic group, Rf represents a perfluoroalkyl ether group or a perfluoroalkyl group, X represents a hydrogen atom or an organosilyl group, and n is an integer of 15 to 4,000 and having a content of cyclic polysiloxanes with a molecular weight of 3,000 or below of 50 ppm or below. This organopolysiloxane is novel in that the content of cyclic siloxanes with a molecular weight of 3,000 or below is only 50 ppm or below and the organopolysiloxane can obviate contact failure due to volatilization of components or surrounding contamination due to bleeding when used as materials in the field of electricity and electronics or as building materials.

6 Claims, 2 Drawing Sheets

ORGANOPOLYSILOXANE

BACKGROUND OF THE INVENTION

1. Field of the Invention

The present invention relates to straight-chain organopolysiloxanes having fluorine-containing organic groups useful as a silicone oil of which various applications are known and also useful as a raw material for rubberlike cured products.

2. Description of Prior Art

Since straight-chain organopolysiloxanes having fluorine-containing organic groups are low in surface tension and refractive index and excellent, for example, in electric insulating properties, reliability, water repellency, anti-foamability, oil resistance, solvent resistance, lubricity, and heat resistance, they are used in various applications in wide industrial fields.

Conventionally, as those straight-chain organopolysiloxanes having fluorine-containing organic groups, many straight-chain organopolysiloxanes having 3,3,3-trifluoropropyl groups are known and as straight-chain organopolysiloxanes having longer fluorine-containing organic groups, for example, straight-chain organopolysiloxanes having long-chain fluoroalkyl ether groups represented by the following general formula (7):

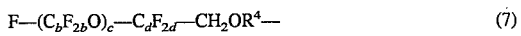

$$F-(C_bF_{2b}O)_c-C_dF_{2d}-CH_2OR^4- \qquad (7)$$

wherein b is an integer of 1 to 3, c is an integer of 1 to 5, d is 1 or 2, and $R^4$ represents a bivalent organic group having 3 to 10 carbon atoms and free from fluorine are known (U.S. Pat. No. 5,118,775 corresponding to Japanese Preexamination Patent Publication (KOKAI) No. 2-219829 and U.S. Pat. No. 5,116,928 corresponding to Japanese Preexamination Patent Publication (KOKAI) No. 2-219830).

As methods of producing straight-chain organopolysiloxanes having fluorine-containing organic groups, methods wherein a cyclotrisiloxane having such a fluorine-containing organic group alone or optionally in combination with a cyclotrisiloxane containing no fluorine, such as hexamethylcyclotrisiloxane, is subjected to ring opening polymerization in the presence of a catalyst, such as sulfuric acid, activated clay, acid-treated activated clay, a hydroxide or a silanolate of an alkali metal, a quaternary ammonium hydroxide, and a quaternary phosphonium hydroxide are known (U.S. Pat. No. 3,483,270 corresponding to Japanese Patent Publication (KOKOKU) No. 46-27267; E. E. Bostick, ACS Polymer Preprint 10 (2), 877 (1969); and Japanese Pre-examination Patent Publication (KOKAI) No. 1- 294738).

However, if it is tried to obtain a straight-chain organopolysiloxane having fluorine-containing organic groups by the above production method, in addition to the intended straight-chain organopolysiloxane, cyclic siloxanes and low-molecular-weight straight-chain siloxanes are produced concomitantly, and particularly cyclic siloxanes having three to several tens of repeat units are produced. Of these, low-molecular-weight straight-chain siloxanes and cyclic siloxanes having a low degree of polymerization can be removed by heating the obtained polymer under reduced pressure, but the removal of cyclic siloxanes having a molecular weigher of about 800 or over, particularly cyclic siloxanes having a molecular weight of about 1,500 or over, is very difficult. Therefore, where the thus obtained straight-chain organopolysiloxane having fluorine-containing organic groups is used as an oil or as a raw material or additive for rubberlike cured products, coatings, etc. by known techniques, the remaining cyclic siloxanes evaporate gradually from the rubberlike cured product or bleeding occurs on the surface of the rubberlike cured product, which causes electrical contact trouble in the field of electricity and environmental contamination or the like in the field of building materials. Cyclic siloxanes that cause such trouble and problems are generally cyclic siloxanes having a molecular weight of 3,000 or below.

Therefore, it is desired to develop straight-chain organopolysiloxanes having fluorine-containing organic groups that are substantially free from low-molecular-weight straight-chain siloxanes and cyclic siloxanes having a low degree of polymerization as well as cyclic siloxanes having a molecular weight of 3,000 or below.

SUMMARY OF THE INVENTION

An object of the present invention is to provide a straight-chain organopolysiloxane having fluorine-containing organic groups that is substantially free from cyclic siloxanes having a molecular weight of 3,000 or below.

The present invention provides an organopolysiloxane comprising substantially only a straight-chain organopolysiloxane represented by the following general formula (1):

wherein $R^1$ represents an unsubstituted or substituted monovalent hydrocarbon group having 1 to 10 carbon atoms, $R^2$ represents a bivalent organic group, Rf represents a perfluoroalkyl ether group represented by the following general formula (2):

wherein $R^3$ represents $-CF(CF_3)-$, $-CF_2CF_2-$ or $-CF(CF_3)CF_2-$, L is 0 or 1, and m is an integer of 1 to 5 or a perfluoroalkyl group represented by the following general formula (3):

wherein a is an integer of 1 to 20, and particularly an integer of 1 to 10, X's, which are the same or different, each represent a hydrogen atom or an organosilyl group represented by the following general formula (4):

wherein $R^4$ is a hydrogen atom or the same group as that indicated above for $R^1$, and n is an integer of 15 to 4,000 and having a content of cyclic polysiloxanes with a molecular weight of 3,000 or below of 50 ppm or below.

The present inventors have found that where a specified cyclohexane is subjected to ring opening polymerization, incidental production of cyclic siloxanes having a molecular weight of about 800 or more is suppressed and that the intended organopolysiloxane can be obtained by stripping the thus obtained polymer.

That is, the present organopolysiloxane can be produced, for example, by a process comprising the steps of:

(A) subjecting a cyclotetrasiloxane represented by the following formula (5):

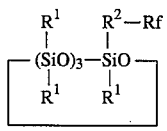

(5)

wherein $R_1$, $R_2$, and Rf have the meanings defined above to ring opening polymerization in the presence of water or an organodisiloxane represented by the following general formula (6):

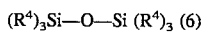

wherein $R^4$ has the meaning defined above and a catalyst and (B) stripping the polymer obtained in the step (A).

The present organopolysiloxane comprises only a straight-chain organopolysiloxane having fluorine-containing organic groups and is novel in that the organopolysiloxane is substantially free from cyclic siloxanes. As described above, since the organopolysiloxane does not contain components that likely evaporate or bleed, the organopolysiloxane is particularly useful in the field of electronics and electricity and in the field of building.

DETAINED DESCRIPTION OF PREFERRED EMBODIMENTS

Figure 1:
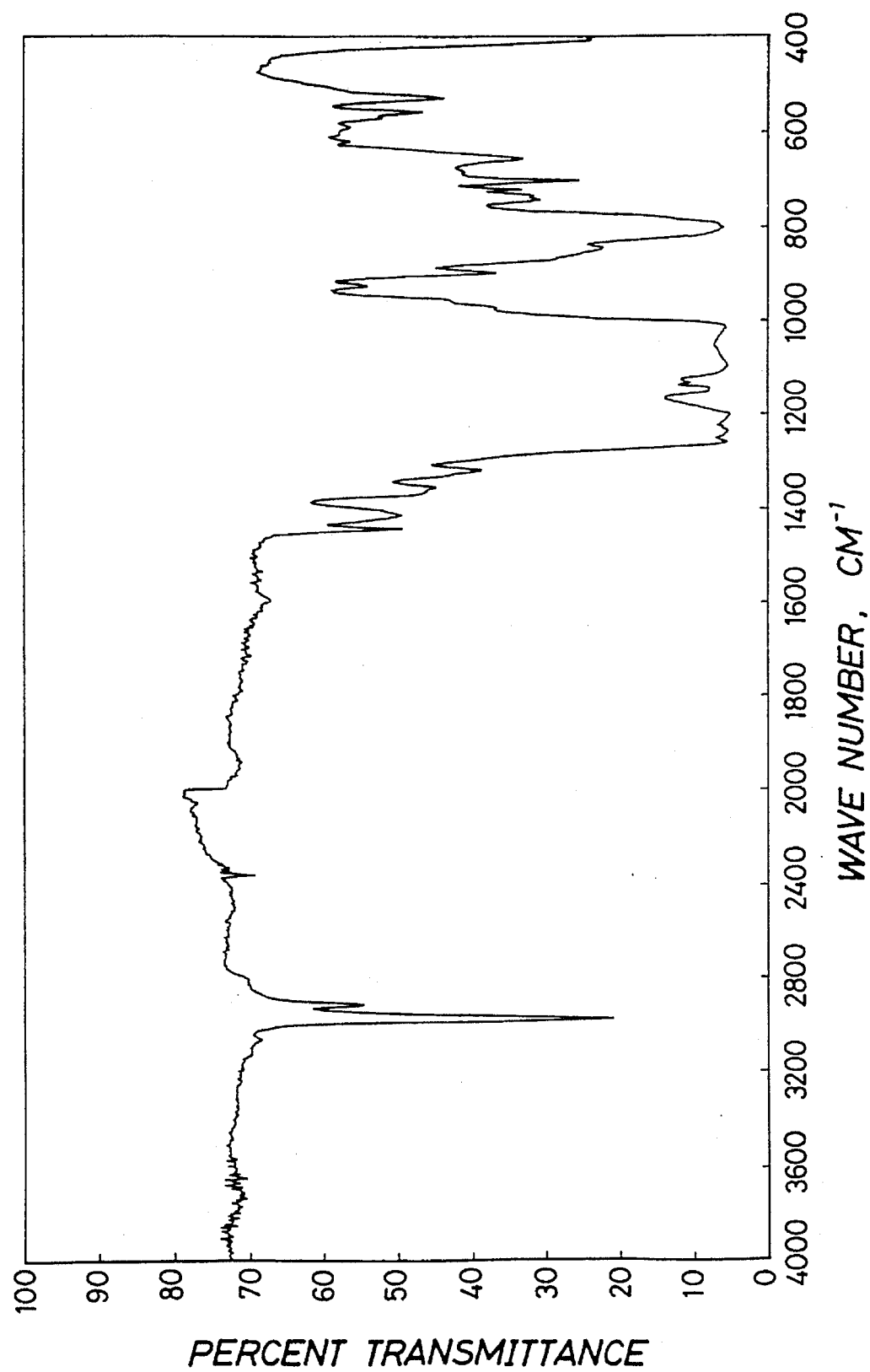
FIG. 1 is the infrared absorption spectrum of the organopolysiloxane obtained in Example 1.

Now, the present invention will be described in detail.
Straight-chain organopolysiloxanes The present organopolysiloxane comprises substantially only a straight-chain organopolysiloxane, wherein, as represented by the general formula (1), both ends are stopped with a hydrogen atom or an organosilyl group represented by the general formula (4) and which has, as side groups, substituted or unsubstituted monovalent hydrocarbon groups $R^1$ having 1 to 10 carbon atoms and groups $Rf\text{-}R^2\text{-}$ wherein a fluorine-Containing organic group Rf is bonded to a bivalent organic group $R^2$ and possess a content of cyclic polysiloxanes with a molecular weight of 3,000 or below of 50 ppm or below.

The above monovalent hydrocarbon group $R^1$ contains 1 to 10 carbon atoms, and particularly 1 to 6 carbon atoms, and includes, for example, an alkyl group, such as a methyl group, an ethyl group, a propyl group, an isopropyl group, a butyl group, an isobutyl group, a ter-butyl group, a pentyl group, a neopentyl group, a hexyl group, a cyclohexyl group, and an octyl group; an aryl group, such as a phenyl group, a tolyl group, and a xylyl group; an alkenyl group, such as a vinyl group, an allyl group, a propenyl group, an isopropenyl group, a butenyl group, a hexenyl group, and a cyclohexenyl group; an aralkyl group, such as a benzyl group and a phenylethyl group; and a corresponding monovalent substituted hydrocarbon group containing 1 to 10 carbon atoms, particularly 1 to 6 carbon atoms, in which part or all of the hydrogen atoms of the above monovalent hydrocarbon group have been replaced with a halogen atom(s), such as chlorine and fluorine, for example, a chloromethyl group, a chloropropyl group and a 3,3,3-trifluoropropyl group.

The above bivalent organic group $R^2$ includes, for example, an alkylene group having 2 to 6 carbon atoms, such as

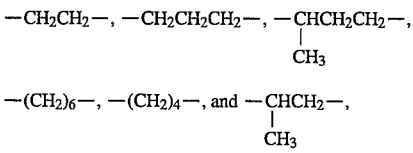

and an alkylene group having 2 to 6 carbon atoms and containing an oxygen atom ( s ), such as
—$CH_2CH_2CH_2O$—, —$CH_2CH_2CH_2OCH_2$—,
—$CH_2CH_2O$—, —$CH_2OCH_2$—, —$CH_2CH_2OCH_2$—,
—$(CH_2)_4$—O—, and —$CH_2CH_2OCH_2CH_2$—, provided that in the general formulas (1) and (5) the oxygen atom is not attached to the silicon atom.

The above fluorine-containing organic group Rf is a perfluoroalkyl group represented by the general formula (2) or a perfluoroalkyl ether group represented by the general formula (3). The perfluoroalkyl ether group includes, for example,

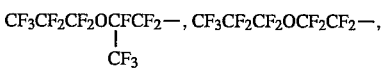

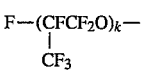

where k is an integer of 1, 2, 3, 4 or 5,

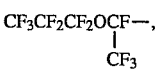

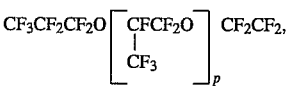

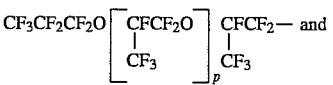

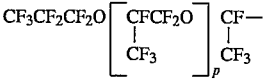

where p is an integer of 1, 2, 3, or 4. The perfluoroalkyl group includes, for example, $CF_3$—, $CF_3CF_2$—, $CF_3CF_2CF_2$—, $CF_3(CF_2)_2CF_2$—, $CF_3(CF_2)_6CF_2$—, $CF_3(CF_2)_qCF_2$— wherein q is an integer of 3 to 8 or 9 to 18, $(CF_3)_2CFCF_2CF_2$—, $(CF_3)_2CF$—, and $(CF_3)_2CFCF_2$—.

The organosilyl group represented by the general formula ( 4 ) includes, for example,

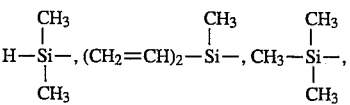

-continued

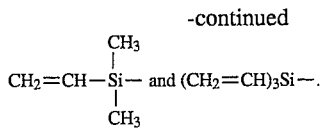

The degree of polymerization of the straight-chain organopolysiloxane of the present invention can be varied in a wide range depending on the purpose and application and is generally 15 to 4,000, particularly 50 to 2,000, and typically about 100 to 1,000 in terms of the value of n in the general formula (1).

The straight-chain organopolysiloxane having fluorine-containing organic groups intended by the present invention includes, for example, straight-chain organopolysiloxanes represented by the following formulas:

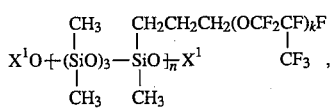

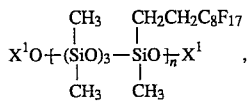

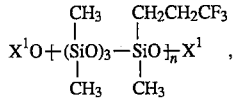

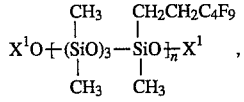

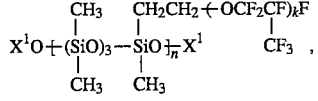

and

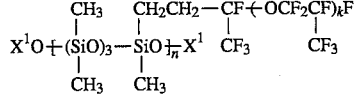

wherein $X^1$ represents a hydrogen atom or an organosilyl group selected from the group consisting of $(CH_3)_3Si-$, $(CH_2=CH)_3-Si-$, $(CH_2=CH)_2(CH_3)Si-$, $(CH_2=CH)(CH_3)_2Si-$, and $(CH_3)_2(H)Si-$, k is 1, 2, 3, 4, or 5, and n has the meaning as defined above.

Process of the preparation

The present organopolysiloxane can be obtained, for example, by (A) subjecting a cyclotetrasiloxane represented by the general formula (5) to ring opening polymerization in the presence of water or an organodisiloxane represented by the general formula (6) and/or an organosilazane represented by $(R^4)_3SiNHSi(R^4)_3$ wherein $R^4$ has the meaning as defined above and a catalyst, and then (B) stripping the thus obtained polymer.

Step (A):

A preferable example of the cyclotetrasiloxane represented by the general formula (5) that is used as a monomer includes a pentamethylcyclotetrasiloxane having a methyl group, for example, as $R^1$, represented by the following general formula (8):

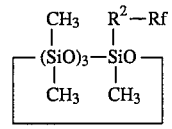

wherein $R^2$ and Rf have the meanings defined above. Said cylcotetrasiloxane can be obtained, as shown in the following reaction formula:

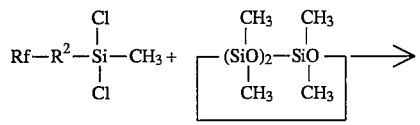

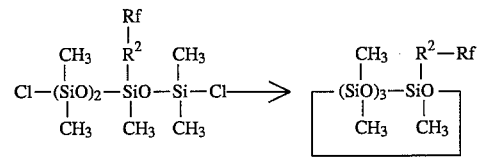

wherein $R^2$ and Rf have the meanings defined above, by reacting a dichlorosilane having the above organic group Rf-$R^2$- and a methyl group, for example, as $R^1$ and a hexamethylcyclotrisiloxane having a methyl group, for example, as $R^1$ in an aprotic polar organic solvent, such as dimethoxyethane, dimethylformamide, hexamethylphosphoric amide, and dimethylsulfoxide to obtain heptamethyl-α,ω-dichlorotetrasiloxane, and then hydrolyzing and cyclizing that dichlorotetrasiloxane.

The catalyst used in this step may be those conventionally used in the ring opening polymerization of cyclotrisiloxanes and examples include an acid, such as sulfuric acid and trifluoromethanesulfonic acid; activated clay; a hydroxide of an alkali metal, such as potassium hydroxide; a silanolate of an alkali metal; a quaternary ammonium hydroxide; and a quaternary phosphonium hydroxide. Among them, trifluoromethanesulfonic acid is preferable. The amount of the catalyst to be used is not particularly restricted and is arbitrary so long as the degree of polymerization of the obtained polymer falls in the range of 15 to 4,000. Specifically, the amount of the catalyst to be used is generally 0.01 to 1.0 parts by weight, and preferably 0.05 to 0.5 parts by weight, per 100 parts by weight of the cyclotetrasiloxane.

In this step, together with the monomer and the catalyst, water or an organodisiloxane represented by the general formula (6) and/or an organosilazane represented by $(R^4)_3SiNHSi(R^4)_3$ wherein $R^4$ has the meaning as defined above is charged. If water is charged and the polymerization reaction is carried out, a straight-chain organopolysiloxane whose ends are stopped with a hydrogen atom is obtained. In this case, the water to be charged into the reaction system may be in such a small amount that the molar ratio of the silicon atom/$H_2O$ in the reaction mixture is in the range of 20 to 6,000. When water is charged, the water may be charged after mixing with a hydrophilic organic solvent, for example, an ether, such as dioxane, glyme, and tetrahydrofuran. Said hydrophilic organic solvent may be any one so long as it can easily be separated from the straight-chain organopolysiloxane produced in the ring opening polymerization reaction and does not adversely affect the physical properties of the straight-chain organopolysiloxane.

Where an organodisiloxane represented by the general formula (6) and/or an organosilazane represented by $(R^4)_3SiNHSi(R^4)_3$ wherein $R^4$ has the meaning as defined above is charged and the polymerization reaction is carried out, a straight-chain organopolysiloxane whose ends are stopped with an organosilyl group represented by the general formula (4) is obtained. Examples of the organodisiloxane include hexamethyldisiloxane, 1,3-divinyltetramethyldisiloxane, 1,3-dimethyltetravinyldisiloxane, 1,1,3,3-tetramethyldisiloxane, and hexavinyldisiloxane, and the organodisilazane includes, for example, organodisilazanes having similar substituents corresponding to those of the respective organodisiloxanes mentioned by way of example such as hexamethyldisilazane, 1,3-divinyltetramethyldisilazane, 1,3-dimethyltetravinyldisilazane, 1,1,3,3-tetramethyldisilazane and hexavinyldisilazane. Although the amount of the organodisiloxane and/or the organodisilazane to be used is not particularly restricted, generally, the amount is 0.003 to 10.0 parts by weight, and preferably 0.01 to 5.0 parts by weight, per 100 parts by weight of the cyclotetrasiloxane.

The temperature of the ring opening polymerization reaction is generally 200° C. or below, and preferably 50° to 150° C. If the reaction temperature is too high, there is a risk that concomitantly produced low-molecular cyclic siloxanes will increase. Further, the time required for the ring opening polymerization reaction is suitably adjusted generally in the range of few minutes to several tens of hours, and preferably is 5 to 20 hours.

The ring opening polymerization reaction can be carried out in a non-solvent system or in a solvent system. The solvent used in the solvent system includes, for example, an aprotic solvent, such as tetrahydrofuran, dioxane, diglyme, and tetraglyme; and a halogenated solvent, such as Freon.

After the completion of the polymerization reaction, it is desirable that the catalyst remaining in the obtained polymer is neutralized to stabilize the polymer. The neutralization is carried out, for example, by adding a neutralizer to the reaction liquid after the polymerization reaction. The neutralizer includes, for example, ammonia and ethylene chlorohydrin.

Step (B):

The reaction mixture obtained through Step (A) is generally filtered to remove the salt produced by the neutralization reaction or is distilled to remove the solvent and then is stripped in Step (B).

The stripping method includes, for example, thin film distillation and solvent extraction.

The thin film distillation is carried out preferably at 100° C. or over, and more preferably 200° to 300° C., and $10^{-1}$ mmHg or below, and more preferably $10^{-2}$ to $10^{-5}$ mmHg. At that time, if the organopolysiloxane has functional groups, such as vinyl groups and silanol groups, it is required to select a temperature at which polymerization by the reaction of these groups does not take place. The distillation apparatus used in the thin film distillation is not particularly restricted and may be any distillation apparatus generally used for separation and purification. For example, a High Evaporator Agitating Type Thin Film Distillation Apparatus (manufactured by KK Sakura Seishakusho) and a Centrifugal Molecular Distillation Apparatus (manufactured by Nihon Sharyo KK) can be mentioned.

The solvent used in the solvent distillation is not particularly restricted if the solvent neither reacts with nor dissolves the intended straight-chain organopolysiloxane, can dissolve volatile components including low-molecular straight-chain organopolysiloxanes and cyclic siloxanes, and does not break the polymer chain. The solvent include an organic solvent, for example, a ketone, such as acetone, methyl ethyl ketone, and methyl isobutyl ketone; and an aromatic hydrocarbon, such as toluene and xylene.

The above stripping can be repeated two times or can be a combination of different stripping techniques.

In the polymer thus obtained through the stripping step, the amount of cyclic siloxanes having a molecular weight of 3,000 or below is reduced to 50 ppm or below and other volatile siloxanes are substantially removed.

Uses

The present straight-chain organopolysiloxane having fluorine-containing organic groups is useful as a silicone oil used in greases, cosmetics, paints, coating materials, etc. and as a raw material or an additive for rubberlike cured products and the like. Since the organopolysiloxane substantially does not contain volatile low-molecular-weight straight-chain siloxanes and cyclic siloxanes at all, volatilization of low-molecular-weight components or bleeding does not take place. Therefore, in the case wherein the organopolysiloxane is used as a material in the field of electronics and electricity, contact disorder will not take place, and in the case wherein the organopolysiloxane is used as a building material, a problem of environmental contamination will not take place.

According to the production method of the present invention, an organopolysiloxane comprising only a straight-chain organopolysiloxane having fluorine-containing organic groups that are substantially intended and are substantially free from cyclic siloxanes is obtained. This is greatly attributed to the structure of the cyclotetrasiloxane of the general formula (5) used as a monomer in the polymerization step (A) in the above production method. The reason for that is not apparent but is probably attributed to the assumption that the reactivities of the four siloxane bonds in the molecule of the cyclotetrasiloxane that is a raw material are different because if a hexamethyltrisiloxane having fluorine-containing organic groups is used as a starting raw material to carry out the same procedure, methylpolysiloxanes having fluorine-containing organic groups that contain large amounts of cyclic products having a molecular weight of about 800 or over are obtained.

EXAMPLES

Now, Examples of the present invention are shown. The present invention are not restricted by the following Examples at all. In the Examples, the viscosity was measured at 25° C.

Example 1

1,000 g (1.374 mol) of a cyclotetrasiloxane represented by the following formula:

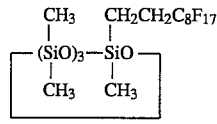

3.2 g (0.0137 mol) of hexavinyldisiloxane, and 1.5 g of trifluoromethanesulfonic acid were mixed in a 1-L separable flask equipped with a stirrer and a thermometer, and the obtained mixture was heated to 80° C. with stirring and was stirred at 80° C. for 16 hours. Thereafter, this liquid was cooled to 50° C., and then 3.4 g of a 28% ammonia aqueous solution was charged into the liquid, followed by stirring at 50° C. for 2 hours to neutralize the catalyst. After the neutralized liquid was distilled under reduced pressure at 150° C., the salt produced by the neutralization reaction was filtered off to obtain 836 g of a crude product of a polymer (viscosity: 3,930 cSt).

836 of the crude product of a polymer was subjected to thin film distillation at 270° C. and 1×10⁻⁴ mmHg by using a thin film molecular distillation apparatus (MS-150 manufactured by Nihon Sharyo KK) to obtain 684 g of a polymer purified product (viscosity: 10,600 cSt).

To determine the content of cyclic polysiloxanes having a molecular weight of 3,000 or below contained in the thus obtained polymer purified product, the polymer purified product was subjected to gas chromatography. 1.00 g of the polymer purified product was mixed with 10.00 g of acetone containing 20 ppm of n-decane (used as an internal standard substance) and was shaken, and a sample taken from the acetone layer obtained by allowing the thus obtained mixture liquid to stand for 24 hours was subjected to gas chromatography. As the analytical apparatus, a Shimazu G. C. 14A (the detector: a flame ion detector) and a capillary column TC-1701 (0.53 mm×30 mm) (manufactured by GL) were used. The column temperature conditions were as follows in the order of (1) to (3):

(1) retention at 70° C. for 1 min.
(2) temperature increase from 70° C. to 270° C. at a rate of 15° C./min.
(3) retention at 270° C. for 40 min.

The analysis was made as described above and from the obtained chart of the gas chromatography, cyclic polysiloxanes having a molecular weight of 3,000 or below contained in the polymer purified product were quantitatively determined, finding that the amount was 1 ppm or below.

With respect to the obtained polymer, the content of vinyl groups and the results of the analysis of the infrared absorption spectrum and the $^1$H-NMR spectrum are given below. From the results, it was confirmed that the obtained polymer was a straight-chain organopolysiloxane represented by the following formula:

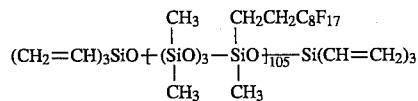

Content of vinyl groups
  Found: 0. 0078 mol/100 g
  Calculated: 0.0082 mol/100 g
Infrared absorption spectrum
  Shown in FIG. 1.
  990 to 1,130 cm⁻¹ (Si—O—Si)
  810, 1,260, 2,970 cm⁻¹ (Si—CH$_3$)
  1,000 to 1,450 cm⁻¹ (C-F)
$^1$H-NMR spectrum (Freon 113 solvent)
  δ value (ppm)
  0.26 to 0.47 (m, Si—CH$_3$, 21H)
  0.76 to 1.20 (m, Si—CH$_2$—, 2H)
  1.76 to 2.80 (m, —CH$_2$—CF$_2$—, 2H)

Example 2

1,000 g (1.19 tool) of a cyclotetrasiloxane represented by the following formula:

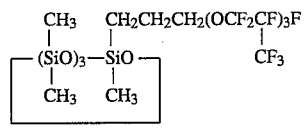

and 2.67 g of potassium hydroxide were mixed in a 1—1 separable flask equipped with a stirrer and a thermometer, and the obtained liquid was heated to 150° C. and was stirred at that temperature for 2 hours. Thereafter, 0.22 g (0.0122 mol) of water was added to the liquid, followed by stirring at 150° C. for 10 hours. Then the liquid was cooled to 100° C., and 9.6 g of ethylene chlorohydrin was charged into it, followed by stirring at 100° C. for 2 hours to neutralize the catalyst. After the neutralized liquid was distilled under reduced pressure at 100° C., the salt produced by the neutralization was filtered off to obtain 921 g of a crude product of a polymer (viscosity: 2,860 cSt).

921 g of the crude product of a polymer was subjected to thin film distillation at 200° C. and 1×10⁻⁴ mmHg by using a thin film molecular distillation apparatus and was then subjected to solvent extraction with acetone and the acetone remaining in the polymer was distilled under a pressure of 2 mmHg at 100° C. to obtain 725 g of a purified product of a polymer (viscosity: 5,920 cSt).

With respect to the thus obtained purified polymer, the content of vinyl groups and the results of the analysis of the infrared absorption spectrum and the NMR spectrum are given below. From the results, it was confirmed that the obtained polymer was a straight-chain organopolysiloxane represented by the following formula:

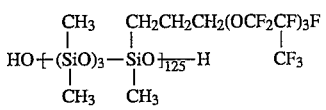

Figure 2:
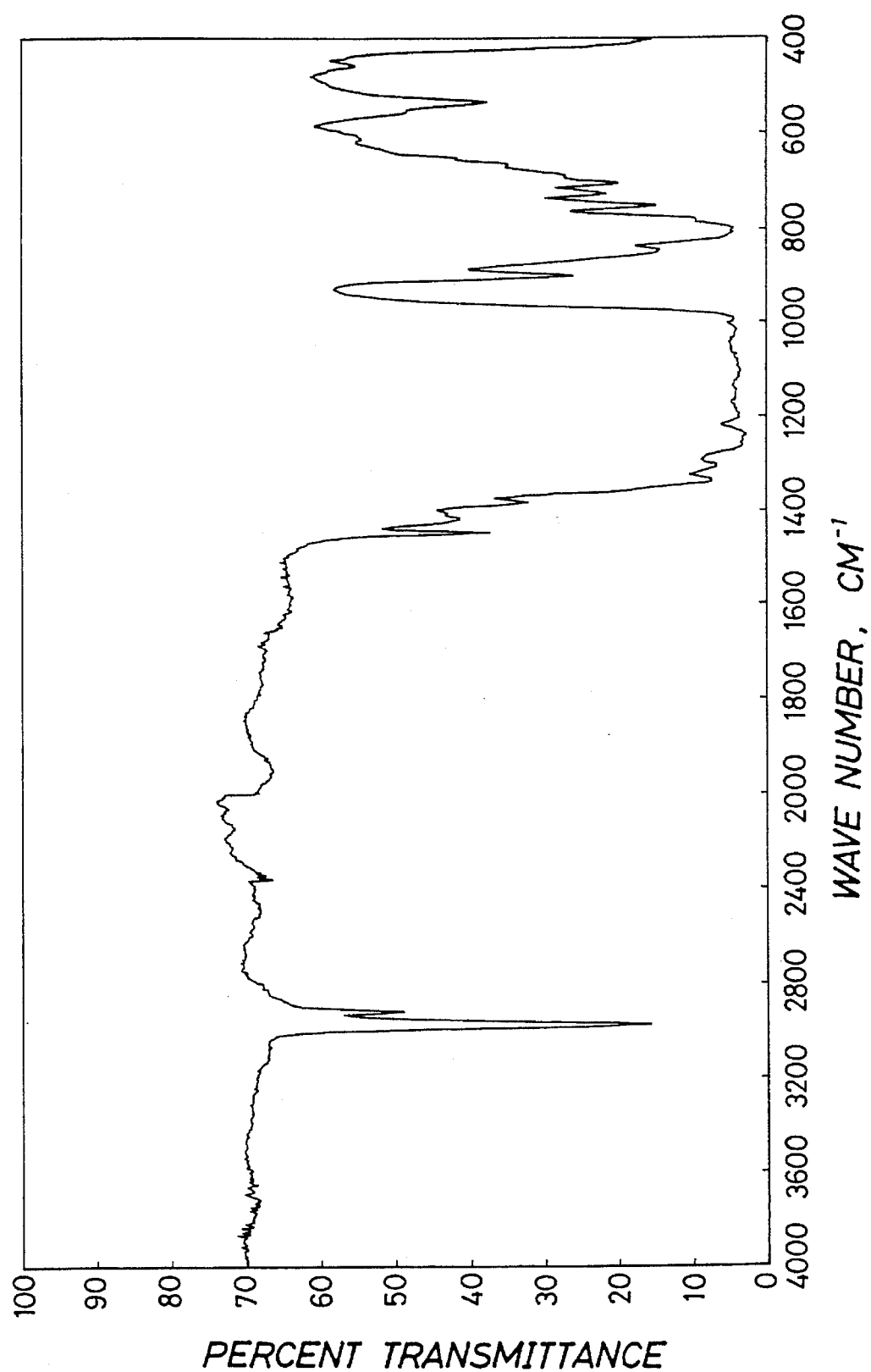
FIG. 2 is the infrared absorption spectrum of the organopolysiloxane obtained in Example 2.

Content of vinyl groups
  Found: 0.0019 mol/100 g
  Calculated: 0.0024 mol/100 g
Infrared absorption spectrum
  Shown in FIG. 2.
  1,000 to 1,130 cm⁻¹ (Si—O—Si)
  810 cm⁻¹, 1,260 cm⁻¹, 2,970 cm⁻¹ (Si—CH$_3$)
  1,000 to 1,450 cm⁻¹ (C-F)
$^1$H-NMR spectrum (Freon 113 solvent)
  δ value (ppm)
  0.20 to 0.47 (m, Si—CH$_3$, 15H)
  0.50 to 0.97 (m, Si—CH$_2$—, 2H)
  1.57 to 2.23 (m, Si—C—CH$_2$—, 2H)
  3.70 to 4.30 (m, —CH$_2$—CF$_2$—, 2H)

The content of cyclic siloxanes having a molecular weight of 3,000 or belwo contained in this organopolysiloxane was measured to be 32 ppm.

What is claimed is:

1. An organopolysiloxane comprising substantially only a straight-chain organopolysiloxane represented by the following general formula (1):

wherein R$^1$ represents an unsubstituted or substituted monovalent hydrocarbon group having 1 to 10 carbon atoms, R$^2$ represents a bivalent organic group, Rf represents a perfluoroalkyl ether group represented by the following general formula (2):

wherein R$^3$ represents —CF(CF$_3$)—, —CF$_2$CF$_2$— or —CF(CF$_3$)CF$_2$—, L is 0 or 1, and m is an integer of 1 to 5, or a perfluoroalkyl group represented by the following general formula (3):

$$C_aF_{2a+1}- \quad (3)$$

wherein a is an integer of 1 to 20, X's, which are the same or different, each represent a hydrogen atom or an organosilyl group represented by the following general formula (4):

$$(R^4)_3Si- \quad (4)$$

wherein $R^4$ represents a hydrogen atom or the same group as $R^1$, and n is an integer of 15 to 4,000, and having a content of cyclic polysiloxanes with molecular weights of 3,000 or below of 50 ppm or below.

2. An organopolysiloxane as claimed in claim 1, wherein, in the general formula (1), $R^1$ represents a group selected from the group consisting of an alkyl group having 1 to 6 carbon atoms, a phenyl group, an alkenyl group having 2 to 6 carbon atoms, and a group in which part or all of one of the hydrogen atoms of the above groups have been replaced with a halogen atom(s) and $R^2$ represents a group selected from the group consisting of an alkylene group having 2 to 6 carbon atoms and an alkylene group having 2 to 6 carbon atoms and containing an oxygen atom(s).

3. An organopolysiloxane as claimed in claim 1, wherein, in the general formula (1), Rf represents $$CF_3CF_2CF_2OCFCF_2-, \quad CF_3CF_2CF_2OCF_2CF_2-,$$
$$\phantom{CF_3CF_2CF_2OC}|$$
$$\phantom{CF_3CF_2CF_2OC}CF_3$$

$$F-(CFCF_2O)_k-$$
$$\phantom{F-(}|$$
$$\phantom{F-(}CF_3$$

where k is 1, 2, 3, 4 or 5, $$CF_3CF_2CF_2OCF-,$$
$$\phantom{CF_3CF_2CF_2OC}|$$
$$\phantom{CF_3CF_2CF_2OC}CF_3$$

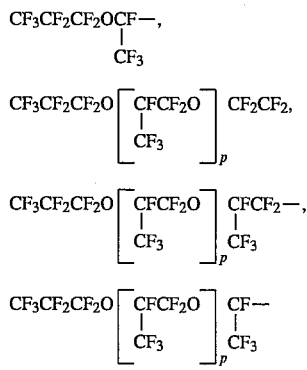

where p is 1, 2, 3 or 4,
$CF_3-$, $CF_3CF_2-$, $CF_3CF_2CF_2-$, $CF_3(CF_2)_2CF_2-$, $CF_3(CF_2)_6CF_2-$, $(CF_3)_2CFCF_2CF_2-$, $(CF_3)_2CF-$, or $(CF_3)_2CFCF_2-$.

4. An organopolysiloxane as claimed in claim 1, wherein, in the general formula (1), X represents an hydrogen atom,

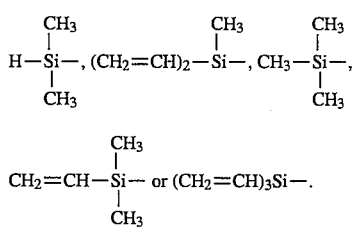

5. An organopolysiloxane as claimed in claim 1, wherein the straight-chain organopolysiloxane represented by the general formula (1) is represented by

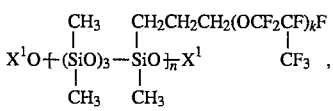

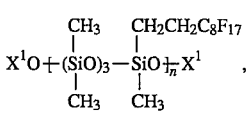

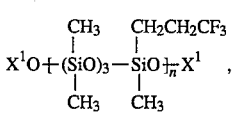

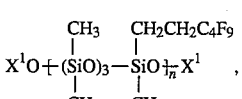

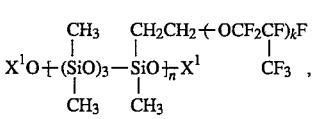

or

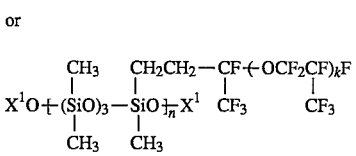

wherein $X^1$ represents a hydrogen atom or an organosilyl group selected from the group consisting of $(CH_3)_3Si-$, $(CH_2=CH)_3-Si-$, $(CH_2=CH)_2(CH_3)Si-$, $(CH_2=CH)(CH_3)_2Si-$, and $(CH_3)_2(H)Si-$, k is 1, 2, 3, 4, or 5, and n is an integer of 15 to 4,000.

6. A straight-chain organopolysiloxane as claimed in claim 1 produced by a process comprising the step (A) of subjecting a cyclotetrasiloxane represented by the following general formula (5):

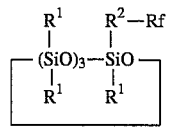

wherein $R^1$, $R^2$, and Rf have the same meanings as defined in claim 1 to ring-opening polymerization in the presence of water or an organodisiloxane represented by the following general (6):

$$(R^4)_3Si-O-Si(R^4)_3 \quad (6)$$

wherein $R^4$ represents a hydrogen atom or the same group as $R^1$,
and/or an organosilazane represented by $(R^4)_3SiNHSi(R^4)_3$ wherein $R^4$ has the same meaning is defined above, and a catalyst, and the step (B) of stripping the polymer obtained in the step (A) of cyclic polysiloxanes with molecular weights of 3,000 or below.

* * * * *